US008612332B1

(12) United States Patent
Gilbertie et al.

(10) Patent No.: US 8,612,332 B1
(45) Date of Patent: Dec. 17, 2013

(54) VALUING FUTURES CONTRACTS

(75) Inventors: Sal Gilbertie, Santa Fe, NM (US);
Barbara Riker, Marlboro, VT (US);
Dale Riker, Marlboro, VT (US); Kelly Teevan, Goffstown, NH (US)

(73) Assignee: Teucrium Trading, LLC, Brattleboro, VT (US)

(*) Notice: Subject to any disclaimer, the term of this patent is extended or adjusted under 35 U.S.C. 154(b) by 0 days.

(21) Appl. No.: 13/309,049

(22) Filed: Dec. 1, 2011

Related U.S. Application Data

(60) Provisional application No. 61/525,275, filed on Aug. 19, 2011.

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| 7,249,077 B2 * | 7/2007 | Williams et al. ................ 705/35 |
| 7,496,531 B1 * | 2/2009 | Gastineau et al. ............. 705/35 |
| 2004/0158519 A1 * | 8/2004 | Lutnick et al. .................. 705/37 |
| 2004/0177022 A1 * | 9/2004 | Williams et al. ................ 705/36 |
| 2006/0212380 A1 * | 9/2006 | Williams et al. ................ 705/35 |
| 2007/0162365 A1 * | 7/2007 | Weinreb ......................... 705/35 |
| 2008/0288419 A1 * | 11/2008 | Miles et al. ................. 705/36 R |

OTHER PUBLICATIONS

Teucrium Corn Fund, Commodity Futures Trading Commission, Risk Disclosure Statement, Jun. 7, 2010, pp. 1-149.

* cited by examiner

*Primary Examiner* — Lindsay M. Maguire
(74) *Attorney, Agent, or Firm* — Thomas Horstemeyer, LLP

(57) ABSTRACT

Disclosed are various embodiments for valuing futures contracts. A valuation engine identifies one or more benchmark components as being in a locked position. The valuation engine calculates assets values of futures contracts corresponding to the benchmark in a locked position, wherein the asset values are based on a sum of a call option price and a call option strike price.

2 Claims, 6 Drawing Sheets

VALUING FUTURES CONTRACTS

CROSS REFERENCE TO RELATED APPLICATIONS

This application claims priority to U.S. provisional application entitled "Single Publicly Traded Commodity Fund Method" having application No. 61/525,275, filed Aug. 19, 2011, the entirety of which is hereby incorporated by reference.

BACKGROUND

Sponsors of publicly traded funds must adhere to certain reporting and accounting standards. For example, certain sponsors must file quarterly 10-Q and annual 10-K forms and adhere to Generally Accepted Accounting Principles (GAAP). As part of these requirements, the sponsors must calculate and report information relating to the valuation of the assets held by the funds.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Funds may hold assets, such as futures contracts, that are bought and sold on an exchange 156. Typically, a futures contract is an agreement between two parties in which the parties agree to exchange a specified asset, such as an agricultural commodity, at an agreed price with delivery to occur at a future period of time. A fund may never intend to take delivery of the underlying asset of the futures contracts. As such, the fund may periodically sell their futures contracts and invest in later-to-expire futures contracts.

Funds may issue and redeem shares to and from shareholders. Thus, funds are typically subject to various regulations that require disclosure and reporting of certain information associated with the fund. For example, a fund may be required to report its net asset value. To this end, the value of assets held by a fund may be ascertained and reported to the appropriate entities.

In order to prevent investors from suffering substantial losses, futures exchanges may invoke "breakers" that temporarily freeze a price of a futures contract when a price increases or decreases by a predetermined amount during a specified time period. For example, if the price of a futures contract falls or rises by the predetermined amount causing the price to be frozen for the duration of a trading day, the futures contract may be referred to as "limit-locked."

In the event that a futures contract is in a locked position, the price of a futures contract quoted on the exchange is frozen and thus may not accurately reflect its true market value. However, because typical valuation is based upon the price quoted on the exchange, the reported valuation of a fund may not reflect its market value. The present disclosure addresses this concern by creating a "synthetic" futures valuation based at least in part on the call option price of the futures contract and the call option strike price of the futures contract. In the following discussion, a general description of the system and its components is provided, followed by a discussion of the operation of the same.

Although the following discussion makes reference to the networked environment, it is understood that the functionality disclosed herein may instead be performed entirely or in part without the use of the networked environment or the associated computing devices. In a case in which the functionality is performed without the use of a computing device, the functionality may be performed by one or more human beings as is appreciated.

Figure 1:
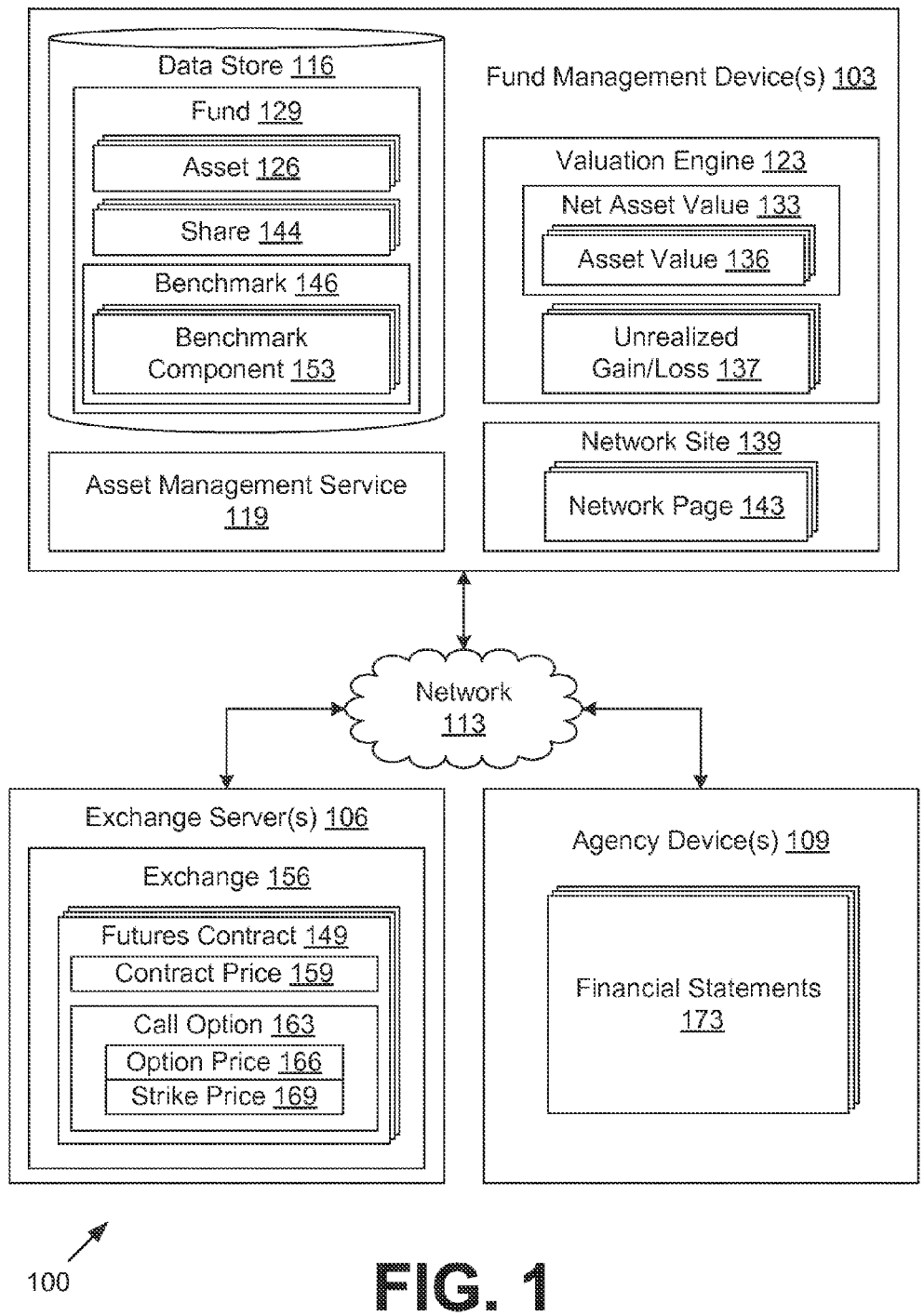
FIG. 1 is a drawing of networked environment according to various embodiments of the present disclosure.

With reference to FIG. 1, shown is a networked environment 100 according to various embodiments. The networked environment 100 includes a fund management device 103, an exchange server 106, and an agency device 109 coupled through a network 113. The network 113 includes, for example, the Internet, intranets, extranets, wide area networks (WANs), local area networks (LANs), wired networks, wireless networks, or other suitable networks, etc., or any combination of two or more such networks.

The fund management device 103 may comprise, for example, a personal computer, server computer, or any other system providing computing capability. Alternatively, a plurality of fund management devices 103 may be employed that are arranged, for example, in one or more server banks or computer banks or other arrangements. For example, a plurality of fund management devices 103 together may comprise a cloud computing resource, a grid computing resource, and/or any other distributed computing arrangement. Such fund management devices 103 may be located in a single installation or may be distributed among many different geographical locations. For purposes of convenience, the fund management device 103 is referred to herein in the singular. Even though the fund management device 103 is referred to in the singular, it is understood that a plurality of fund management devices 103 may be employed in the various arrangements as described above.

Various applications and/or other functionality may be executed in the fund management device 103 according to various embodiments. Also, various data is stored in a data store 116 that is accessible to the fund management device 103. The data store 116 may be representative of a plurality of data stores as can be appreciated. The data stored in the data store 116 is associated with the operation of the various applications and/or functional entities described below.

The components executed on the fund management device 103, for example, include an asset management service 119, a valuation engine 123, and other applications, services, processes, systems, engines, or functionality not discussed in detail herein. The asset management service 119 is executed to buy, sell, trade and/or perform other functionality associated with managing assets 126 associated with the fund 129 as will be described.

The valuation engine 123 calculates the net asset value 133 associated with the fund 129 and may perform other related functionality. To this end, the valuation engine 123 may also calculate the asset value 136 and unrealized gains/losses 137 of the assets 126 held by the fund 129. An asset value 136 may be viewed as the market value or fair value associated an asset 126. The net asset value 133 may be viewed as a combined total of the asset values 136. The unrealized gains/losses 137 are increases or decreases in the values of the assets 126 held by the fund 129.

The fund management device 103 may also generate a network site 139 to provide a network presence for the fund 129. Specifically, the network site 139 may include a network page server to serve data such as the network pages 143 to clients over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The data stored in the data store 116 may include data associated with the fund 129 and potentially other data. Specifically, the data store 116 may include data representing the assets 126 held by the fund 129, data representing shares 144 issued by the fund 129, and data associated with a benchmark 146 to which the fund 129 bases its performance. The assets 126 may be futures contracts 149, options contracts, swap agreements, or other interests.

The shares 144 represent fractional beneficial interests in the fund 129. The fund 129 may issue or redeem shares 144 to buyers. The shares 144, in turn, may be bought, sold, and/or traded on the exchange 156 as is appreciated.

The benchmark 146 may be a metric to which the fund 129 bases its management and/or performance. As such, the benchmark 146 may comprise one or more benchmark components 153 that may be weighted. As a non-limiting example, the benchmark 146 may be a weighted average of closing settlement prices for one or more futures contracts 149, and the fund 129 may seek to cause a percentage change in its net asset value 133 per share 144 to correspond to the percentage change in the benchmark 146.

The benchmark components 153 may include multiple futures contracts 149 that may be weighted to capture the seasonality and trading patterns of the underlying benchmark asset. To this end, several factors, such as the seasonality of supply and/or demand, production considerations, transportation considerations, storage logistics, traditional usage patterns, trade and regulatory stimuli and/or barriers, weather patterns, and other factors may be considered in determining the weighting values for the benchmark components 153. Further, the benchmark 146 may be considered "static" in that the fund 129 may intend for the weighting values of the benchmark components 153 to remain approximately constant from one evaluation period to another evaluation period.

The exchange server 106 may comprise, for example, a server computer, or any other system providing computing capability. Alternatively, a plurality of exchange servers 106 may be employed that are arranged, for example, in one or more server banks or computer banks or other arrangements. For example, a plurality of exchange servers 106 together may comprise a cloud computing resource, a grid computing resource, and/or any other distributed computing arrangement. Such exchange servers 106 may be located in a single installation or may be distributed among many different geographical locations. For purposes of convenience, the exchange server 106 is referred to herein in the singular. Even though the exchange server 106 is referred to in the singular, it is understood that a plurality of exchange servers 106 may be employed in the various arrangements as described above.

The exchange server 106 may facilitate the fund management device 103 and other devices accessing and participating in the exchange 156. The exchange 156 is an environment where parties may buy, sell, trade, and/or exchange futures contracts 149, options contracts, shares 144, and other assets 126. A futures contract 149 may be an agreement between parties to purchase an asset 126 at a specified contract price 159 with delivery to be performed at a time period in the future.

Options contracts, such as call options 163, may also be bought, sold, traded, and/or exchanged on the exchange 156. A call option 163 is an agreement in which a buyer has the option, but not the obligation, to buy an underlying asset at a specified strike price 169. In exchange for this option to buy the asset, the buyer typically pays an option price 163. It is understood that the fund management device and other devices may obtain the data described herein from the exchange server 106 or from any financial data provider. For example, the information may be obtained through a BLOOMBERG® terminal or from any other provider.

The agency device 109 may comprise, for example, a server computer or any other system providing computing capability. For purposes of convenience, the agency device 109 is referred to herein in the singular. Even though the agency device 109 is referred to in the singular, it is understood that a plurality of agency devices 109 may be employed in the various arrangements as is appreciated.

The agency device 109, for example, may obtain or create financial statements 173 and other information for use in regulating the exchange 156, the fund 129, or other entities. As non-limiting examples, the agency device 109 may be associated with the U.S. Securities and Exchange Commission (SEC), Commodity Futures Trading Commission (CFTC), National Futures Association (NFA), Chicago Board of Trade (CBOT), a financial auditor, or any other agency. The financial statements 173 may be, for example, accounting reports such as 10-Q forms, 10-K forms, monthly statements, or any other financial statement.

Next, a general description of the operation of the various components of the networked environment 100 is provided. To begin, a discussion of the asset 126 management of the fund 129 is provided. As discussed above, the fund 129 may be a pool of assets 126, such as commodities futures contracts 149. An investment objective of the fund 129 may be to have the changes in percentage terms of the net asset value 133 per share 144 reflect the changes in percentage terms of the benchmark 146 of the fund 129. For example, it may be that the asset management service 119 causes a percentage change of the net asset value 133 per share 144 of the fund 129 to be within N percent of the percentage change of the benchmark 146 performance within any M-day trading time period, where N and M are predefined numbers. Additionally, the asset management service 119 may cause the weighted values of the benchmark components 153 to remain approximately constant from one evaluation period to another evaluation period.

To this end, the asset management service 119 may identify benchmark components 153 and determine weighting values for each benchmark component 153. As a non-limiting example, the benchmark components 153 may be the price of three futures contracts 149, with the price of the first futures contract 149 being 35%, the price of the second futures contract 149 being 30%, and the price of third futures contract 149 being 35% of the benchmark 146. The weighting values may be selected based at least in part on seasonality of supply and/or demand, product factors, transportation factors, storage logistics, traditional usage patterns, trade and regulatory stimuli and/or barriers, and various other considerations.

The asset management service 119 may then determine prices of the benchmark components 153 and calculate the benchmark 146 for each time period (e.g., hour, day, month, etc.) that is relevant in managing the net asset value 133 of the fund 129. The average change of the calculated benchmark 146 may be calculated and stored in the data store 116.

The asset management service 119 may then obtain data representing the net asset value 133 of the fund 129 for the same time periods above. The change in net asset value 133 per share 144 for each time period may be calculated, and an average change of the net asset value 133 per share determined.

The asset management service 119 may compare the average change of the net asset value 133 per share 144 with the average change of the benchmark 146. If the difference falls outside of a predefined threshold, such as that defined by the investment objective of the fund 129, the asset management service 119 may initiate a request to buy, sell, and/or trade assets 126 in order to meet the predefined threshold.

Next, a discussion of the valuation of assets 126 is provided. As discussed above, the exchange 156 may invoke "breakers" to temporarily freeze the contract price 159 of a futures contract 149. As such, the contract price 159 may not accurately reflect the market value of the futures contract 149. In accordance with the present disclosure, the asset value 136 of a futures contract 149 may be determined even when the futures contract 149 is in a locked position.

To begin, the valuation engine 123 obtains data corresponding to the benchmark components 153 and determines whether any of the benchmark components 153 are in a locked position. For the benchmark components 153 that are not in a locked position, the asset values 136 for the corresponding futures contracts 149 are determined to be the contract price 159 as indicated on the exchange 156.

For the benchmark components 153 that are in a locked position, the valuation engine 123 calculates a "synthetic" valuation of the futures contracts 149 153 based at least in part on the option price 166 of the call option 163 and the call option 163 strike price 169. To this end, the valuation engine 123 may sum the call option 163 strike price 169 and option price 163 of the futures contract 149. The sum may be compared to various indicators to decide whether the sum is a close approximation of the market value of the futures contract 149. For example, if an objective of the fund 129 is to track the performance of the benchmark 146, the price of the shares 144 may be an indicator for which the sum of the option price 166 and strike price 169 may be compared. Thus, the valuation engine 123 may determine whether the difference in the sum and the share 144 price is within a threshold.

If it is determined that the sum of the option price 166 and strike price 169 is within the threshold, the unrealized gains and/or losses of the futures contracts 149 in a locked position may be calculated using the synthetic valuation. Additionally, the unrealized gains and/or losses of the futures contracts 149 not in a locked position may be calculated using the contract price 159 of the futures contract 149.

Further, a financial statement 173 may be generated that discloses the asset values 136 of the fund 129. In order to determine the asset values 136 using the synthetic valuation, the difference in the unrealized gains/losses calculations may be added (or subtracted, as is appreciated) to the unrealized gains/losses calculation that uses the contract price 159. The financial statement 173 may then be updated to reflect these calculations The resulting asset values 136, net asset values 133, and financial statements 173 may transmitted through the network 113 to an agency device 109 or other device, or the data may be stored in the data store 116. Additionally, a network page 143 may be encoded for rendering the data embodying the asset values 136, net asset values 133, and financial statements 173

Figure 2A:
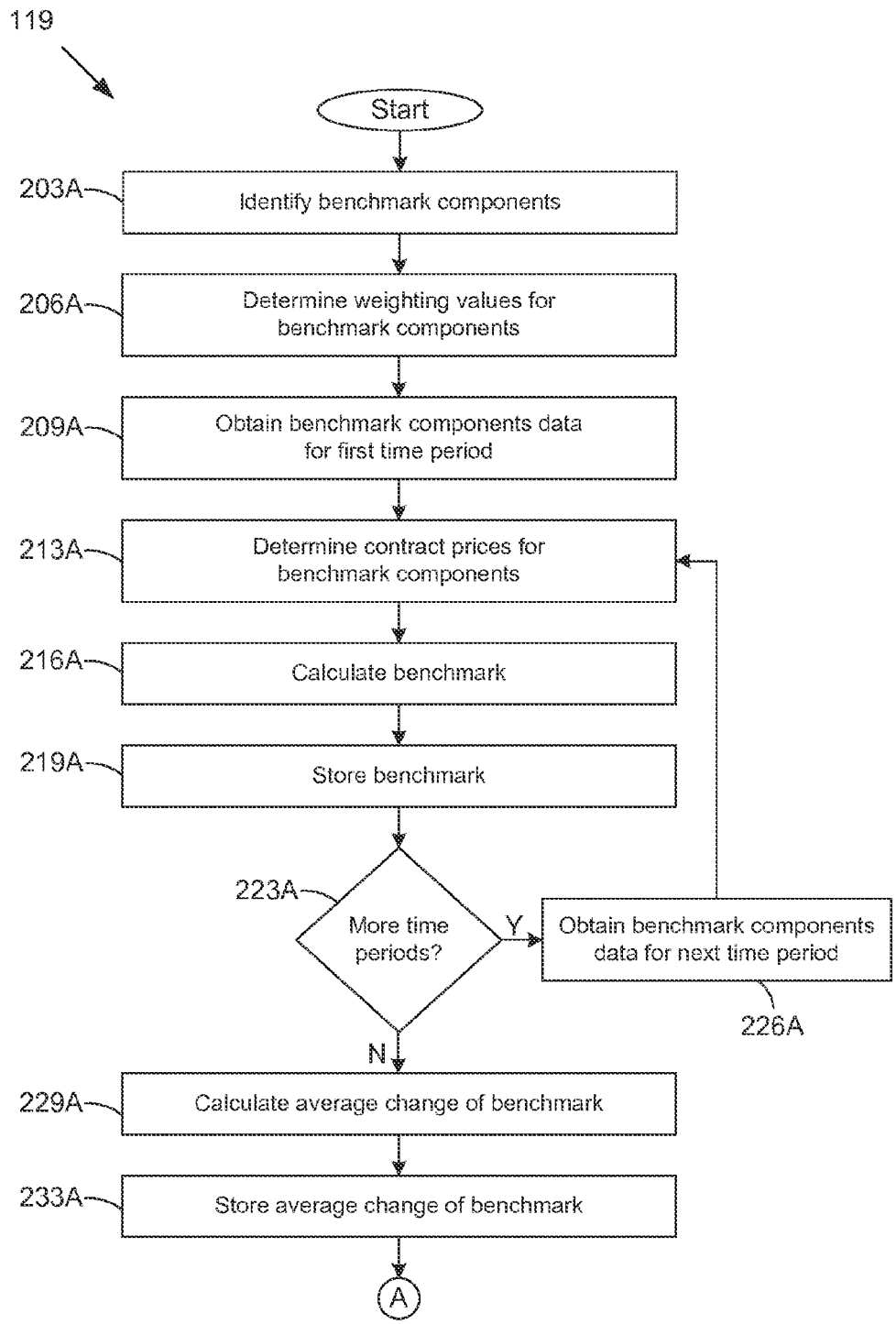
FIGS. 2A-2B is a flowchart illustrating one example of functionality implemented as portions of a asset management service executed in a fund management device in the networked environment of FIG. 1 according to various embodiments of the present disclosure.
Figure 2B:
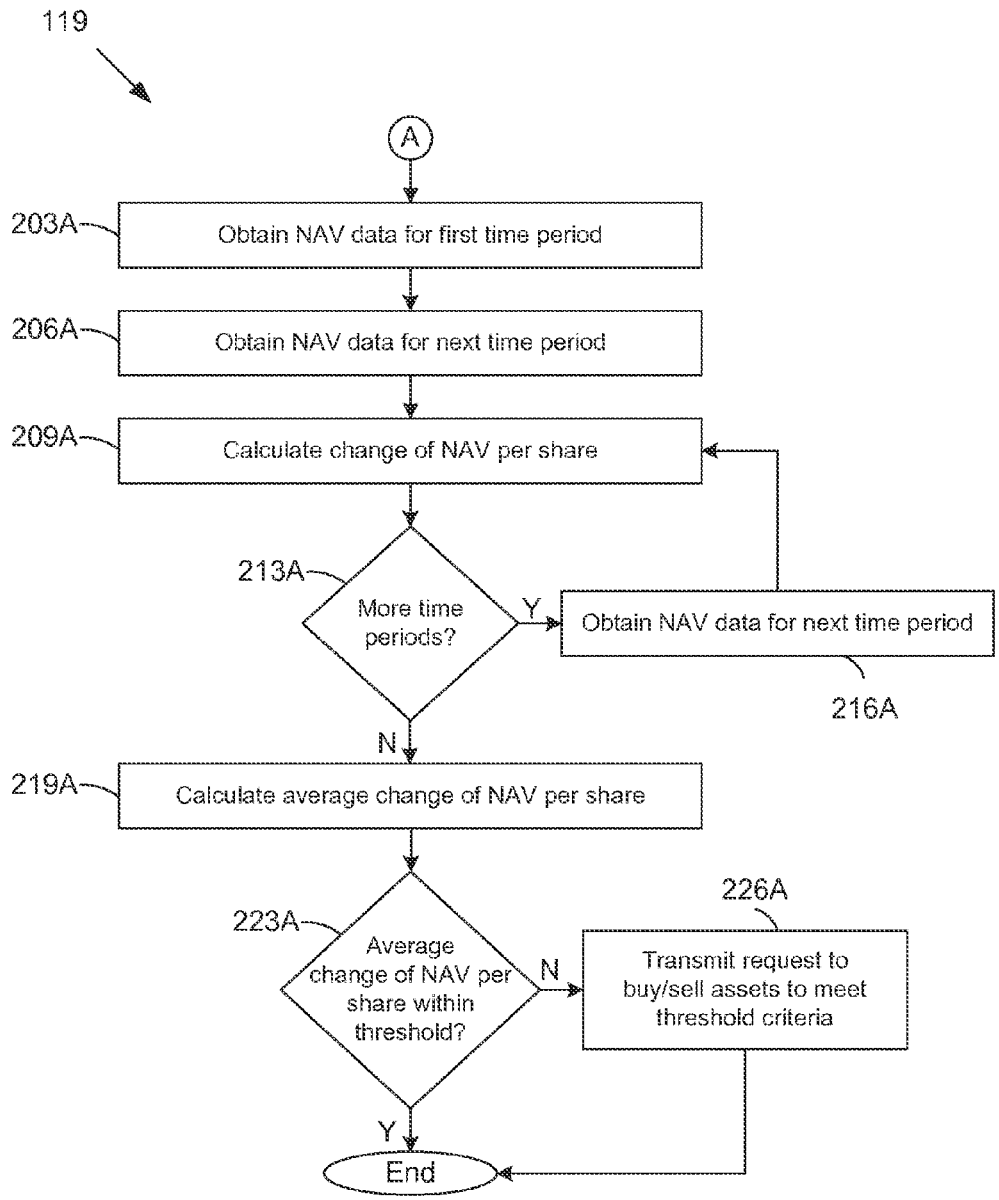

Referring next to FIGS. 2A-2B, shown is a flowchart that provides one example of the operation of a portion of the asset management service 119 according to various embodiments. It is understood that the flowchart of FIGS. 2A-2B provides merely an example of the many different types of functional arrangements that may be employed to implement the operation of the portion of the asset management service 119 as described herein. As an alternative, the flowchart of FIGS. 2A-2B may be viewed as depicting an example of steps of a method implemented in the fund management device 103 (FIG. 1) or by a human being according to one or more embodiments.

With reference to FIG. 2A, the asset management service 119 identifies benchmark components 153 (FIG. 1), as shown in box 203A. The benchmark components 153 may be based on, for example, the prices of futures contracts 149 (FIG. 1) that capture seasonality and trading patterns of a commodity. Next, as indicated in box 206A, the weighting values for the benchmark components 153 may be determined. Factors such as the seasonality of supply and/or demand, production considerations, transportation considerations, storage logistics, traditional usage patterns, trade and regulatory stimuli and/or barriers, weather patterns, and other factors may be considered in determining the weighting values.

The asset management service 119 then moves to box 209A and obtains the data corresponding the benchmark components 153 for first time period of interest. The first time period of interest may be, for example, the first date of a window for which the percent change of the benchmark 146 (FIG. 1) will be calculated. Next, as shown in box 213A, the contract prices 159 (FIG. 1) for the benchmark components 153 are determined. Moving to box 216A, the benchmark 146 (FIG. 1) is calculated and stored, as indicated in box 219A.

The asset management service 119 then determines whether there are more time periods for which to calculate the benchmark 146, as shown in box 223A. If so, the data for the benchmark components 153 for the next time period is obtained, as shown in box 226A, and boxes 213A-223A are repeated as shown.

Once there are no more time periods for which to calculate the benchmark 146, the asset management service 119 moves to box 229A, and the average change of the benchmark 146 is calculated and stored, as indicated in box 233A.

Turning to FIG. 2B, the asset management service 119 then obtains the net asset value 133 (FIG. 1) data for the first time period, as shown in box 203B. It is understood that the net asset value 133 may be calculated using the techniques disclosed herein or using any other method. Next, as shown in box 206B, the net asset value 133 for the next time period is obtained. As indicated in box 209B, the change of the net asset value 133 per share 144 (FIG. 1) is then calculated. Thus, as a non-limiting example, the change in net asset value 133 per share 144 between two consecutive dates may be calculated.

Next, as shown in box 213B, the asset management service 119 determines whether there are more time periods for which to calculate the change in net asset value 133 per share 144. If so, the net asset value 133 data for the next time period is obtained, as shown in box 216B, and boxes 209B-213B are repeated as shown.

Once the change in net asset value 133 per share 144 has been calculated for all of the relevant time periods, the average change in net asset value 133 per share 144 is calculated, as shown in box 219B. Thereafter, the asset management service 119 determines whether the average change in net asset value 133 per share 144 is within a threshold, for example, as specified by the investment objectives of the fund 129 (FIG. 1). If not, the asset management service 119 initiates a request to buy, sell, and/or trade assets to meet the threshold criteria. As non-limiting examples, a prompt or other indicator may alert an agent to buy or sell assets, trades may be executed automatically, or any other process of initiating a request may be performed.

Figure 3A:
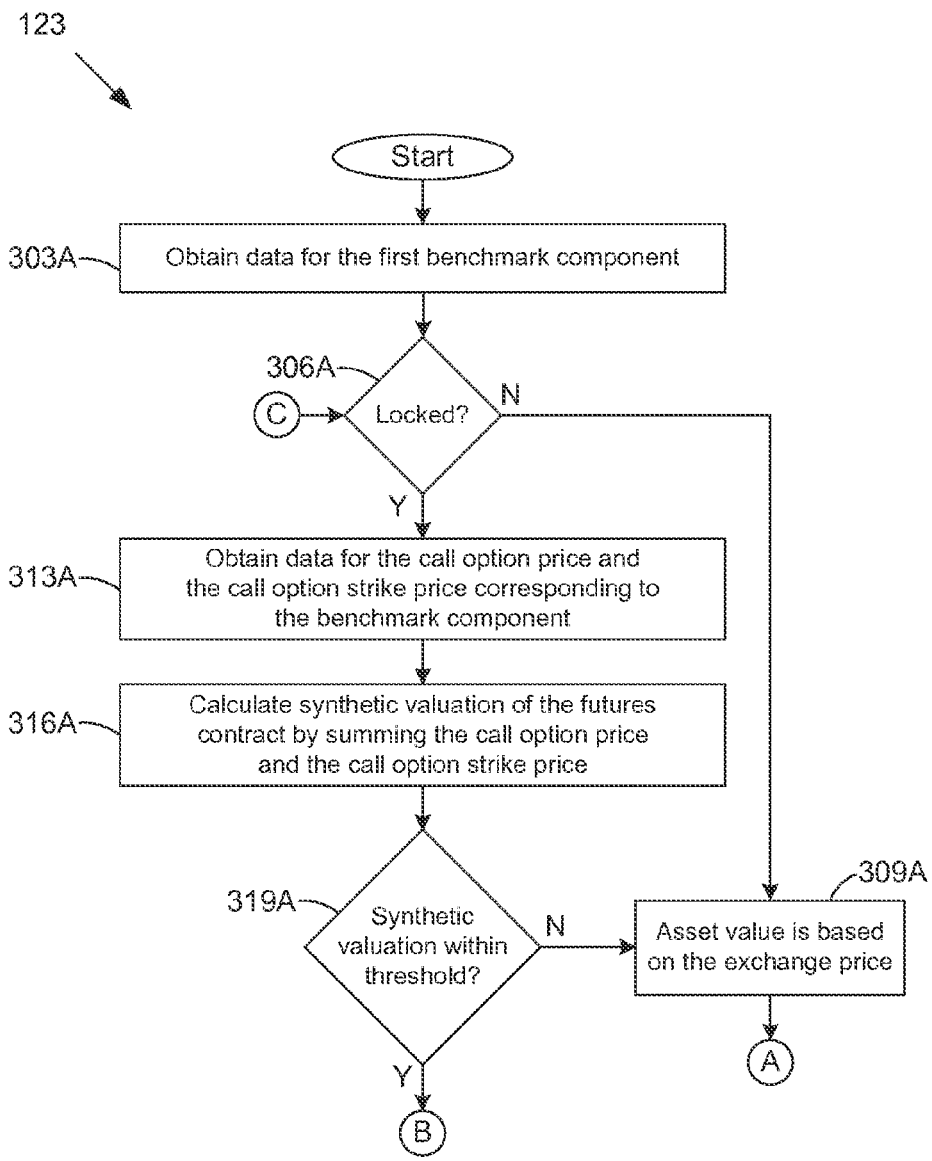
FIG. 3A-3B is a flowchart illustrating one example of functionality implemented as portions of a valuation engine executed in a fund management device in the networked environment of FIG. 1 according to various embodiments of the present disclosure.
Figure 3B:
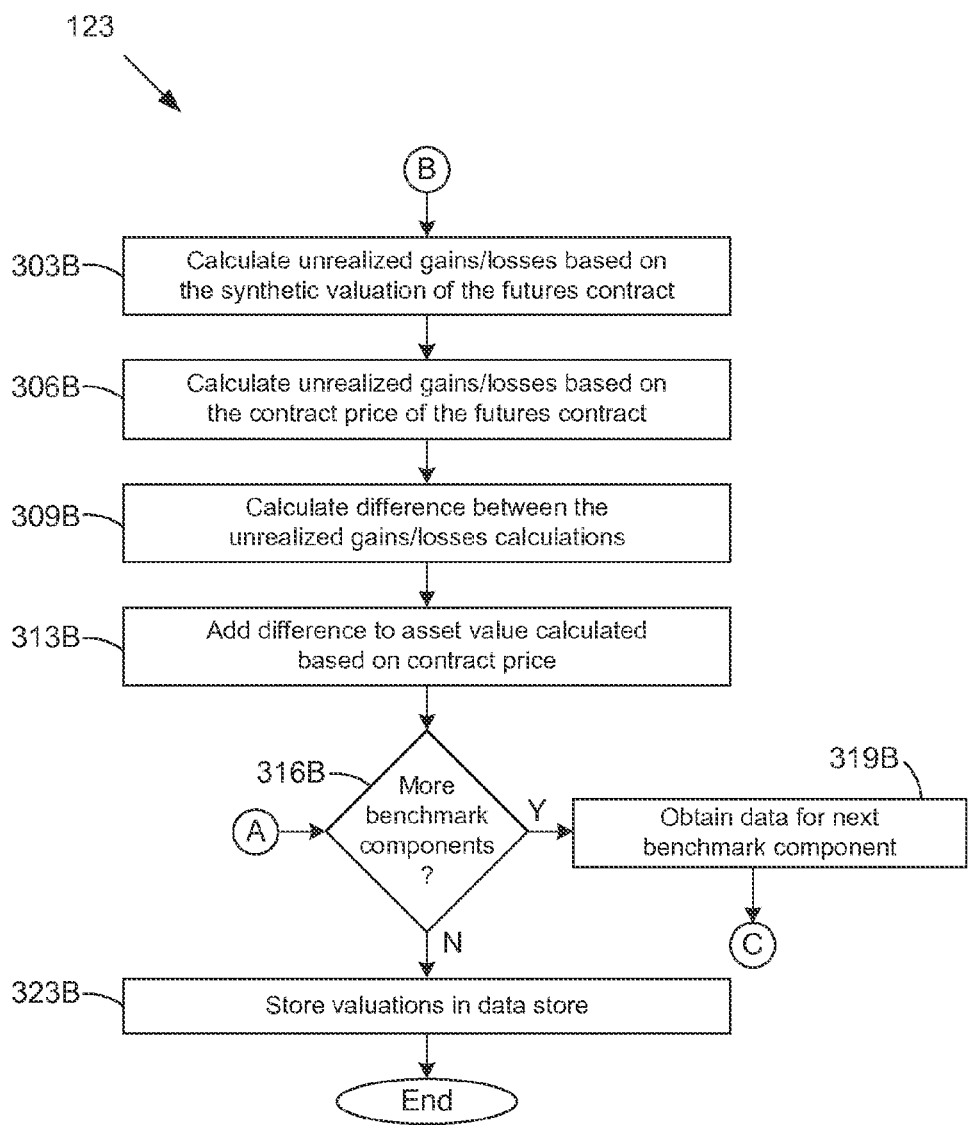

Referring next to FIGS. 3A-3B, shown is a flowchart that provides one example of the operation of a portion of the valuation engine 123 according to various embodiments. It is understood that the flowchart of FIGS. 3A-3B provides merely an example of the many different types of functional arrangements that may be employed to implement the operation of the portion of the valuation engine 123 as described herein. As an alternative, the flowchart of FIGS. 3A-3B may be viewed as depicting an example of steps of a method implemented in the fund management device 103 (FIG. 1) or by a human being according to one or more embodiments.

With reference to FIG. 3A, the valuation engine 123 obtains data for the first benchmark component 153 (FIG. 1), as shown in box 303A. Next, the valuation engine 123 determines whether the futures contract 149 (FIG. 1) corresponding to the benchmark component 153 is in a locked position. If so, the valuation engine 123 determines the asset value 136 (FIG. 1) to be based at least in part on the contract price 159 (FIG. 1). Thereafter, the valuation engine 123 moves to box 316B (FIG. 3B) as shown.

If the benchmark component 153 is in a locked position, the valuation engine 123 moves to box 313A and obtains data representing the option price 166 (FIG. 1) and strike price 169 (FIG. 1) of the call option 163 (FIG. 1) corresponding to the benchmark component 153. Next, as indicated in box 316A, the synthetic valuation of the futures contract 149 is calculated by summing the option price 166 and strike price 169. The valuation engine 123 then determines whether the synthetic valuation is within a specified threshold, as shown in box 319A. The threshold may be based on any indicator, such as the price of a share 144 of the fund 129. Further, the threshold may be predefined or a parameter set a runtime, or a user of the fund management device 103 may determine whether the synthetic valuation is within the threshold.

If the synthetic valuation falls outside of the threshold, the valuation engine 123 moves to box 309A, and the asset value 136 is determined to be the contract price 159 of the futures contract 149. Thereafter, the valuation engine 123 moves to box 316B (FIG. 3B). Alternatively, if the synthetic valuation is determined to be within the threshold, the valuation engine 123 moves to box 303B (FIG. 3B).

Turning to FIG. 3B, the unrealized gains/losses are calculated using the synthetic valuation, as shown in box 303B. Next, as indicated in box 306B, the unrealized gains/losses are calculated using the contract price 159 (FIG. 1) as indicated on the exchange 156 (FIG. 1). The valuation engine 123 then calculates the difference between these unrealized gains/losses calculations, as shown in box 309B.

The valuation engine 123 then moves to box 313B and adds (or subtracts, as appreciated) the difference in the unrealized gains/losses calculations to an asset value 136 (FIG. 1) that was calculated using the contract price 159. It is noted that the valuation engine 123 may calculate the asset value 136 using the contract price 159, or such data may be obtained from an agency device 109 (FIG. 1).

Next, it is determined whether there are more benchmark components 153 (FIG. 1) to process, as shown in box 3168. Is so, the valuation engine 123 obtains the data for the next benchmark component 153, as indicated in box 319B. Thereafter, the valuation engine 123 moves to box 306A (FIG. 3A), and boxes 306A-316B are repeated as shown. If there are no more benchmarks components 153 to process, the resulting valuations are stored in the data store 116, as shown in box 323B. Additionally or alternatively, the valuations may be transmitted to an agency device 109, encoded for rendering on a network page 143 (FIG. 1), or the data may be used for other purposes. Thereafter, the process ends.

Figure 4:
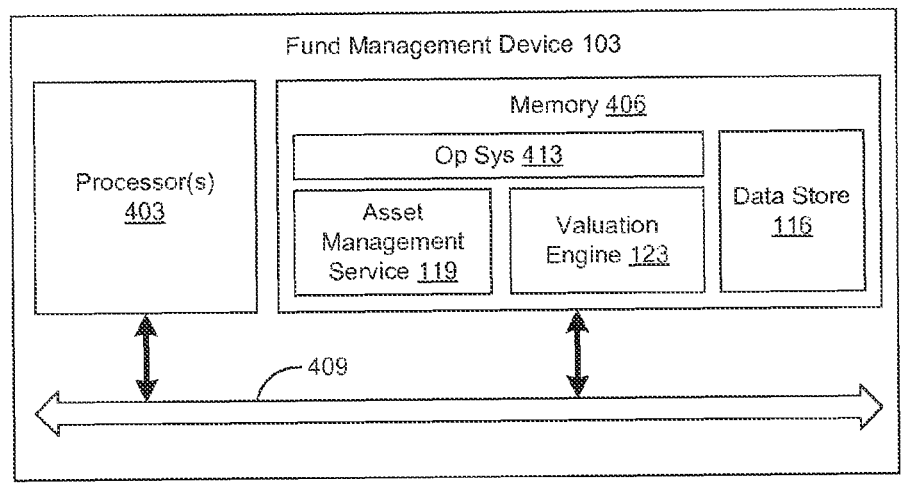
FIG. 4 is a schematic block diagram that provides one example illustration of a fund management device employed in the networked environment of FIG. 1 according to various embodiments of the present disclosure.

With reference to FIG. 4, shown is a schematic block diagram of the fund management device 103 according to an embodiment of the present disclosure. The fund management device 103 includes at least one processor circuit, for example, having a processor 403 and a memory 406, both of which are coupled to a local interface 409. To this end, the fund management device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the asset management service 119, valuation engine 123, and potentially other applications. Also stored in the memory 406 may be a data store 116 and other data. In addition, an operating system 413 may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 113 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the asset management service 119, valuation engine 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-2B and FIGS. 3A-3B show the functionality and operation of an implementation of portions of the asset management service 119 and valuation engine 123, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s). If performed by a human being, each block may represent a step that may be performed with or without the use of a computing device.

Although the flowcharts of FIGS. 2A-2B and FIGS. 3A-3B show a specific order of execution, it is understood that the order of execution may differ from that which is depicted. For example, the order of execution of two or more blocks may be scrambled relative to the order shown. Also, two or more blocks shown in succession in FIGS. 2A-2B and FIGS. 3A-3B may be executed concurrently or with partial concurrence. Further, in some embodiments, one or more of the blocks shown in FIGS. 2A-2B and FIGS. 3A-3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the asset management service 119 and valuation engine 123, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one processor; and
   a valuation engine executable in the at least one computing device, the valuation engine comprising:
   logic, executable by the at least one processor, that identifies a benchmark component as being in a locked position, the benchmark component being a part of a benchmark that determines a net asset value of a fund; and
   logic, executable by the at least one processor, that calculates an asset value of a futures contract that corresponds to the benchmark component, the asset value being based at least in part on a sum of a call option price and a call option strike price;

wherein the benchmark component is identified as being in the locked position if a price for the benchmark component increases by a predetermined amount within a time period.

2. A system, comprising:
- at least one computing device comprising at least one processor; and
- a valuation engine executable in the at least one computing device, the valuation engine comprising:
  - logic, executable by the at least one processor, that identifies a benchmark component as being in a locked position, the benchmark component being a part of a benchmark that determines a net asset value of a fund; and
  - logic, executable by the at least one processor, that calculates an asset value of a futures contract that corresponds to the benchmark component, the asset value being based at least in part on a sum of a call option price and a call option strike price;
  - wherein the benchmark component is identified as being in the locked position if a price for the benchmark component decreases by a predetermined amount within a time period.

* * * * *